June 23, 1964 R. J. BLUM 3,138,794

BINARY CODE TRANSLATING DEVICE

Filed Oct. 25, 1961 2 Sheets-Sheet 1

INVENTOR
ROBERT J. BLUM
BY
ATTORNEY

June 23, 1964 R. J. BLUM 3,138,794

BINARY CODE TRANSLATING DEVICE

Filed Oct. 25, 1961 2 Sheets-Sheet 2

INVENTOR
ROBERT J. BLUM
BY
ATTORNEY

United States Patent Office 3,138,794
Patented June 23, 1964

3,138,794
BINARY CODE TRANSLATING DEVICE

Robert J. Blum, Bayside, N.Y., assignor to Sperry Rand Corporation, Great Neck, N.Y., a corporation of Delaware Filed Oct. 25, 1961, Ser. No. 151,130
10 Claims. (Cl. 340—347)

This invention relates to code converters and more particularly it concerns a means for translating binary coded words.

Digital computer systems generally involve the processing of digitally encoded physical quantities, expressed as binary words, in such a manner that the relationship of these quantities to each other or to known criteria may be ascertained and utilized in an advantageous manner. While in theory the particular code arrangement utilized may be purely arbitrary, practical considerations fix certain criteria for optimum overall efficiency. Thus the processing or computer portions of digital equipment most often utilize the well-known conventional binary code for simplicity and versatility. On the other hand, the encoding portions of the equipment (which convert physical quantities to digital words), often use the reflected or cyclic binary code to avoid ambiguity problems.

Although many techniques have been employed in the past for translating or converting between conventional and reflected binary codes, none of them have been completely satisfactory. For example, although known serial type code converters operate instantaneously, maintain the coded information in serial form and require only minimum of components, their output always results in the most significant digit of each word being supplied first. Since digital computing equipment often requires serial application of the coded word with its least significant digit first, an additional register or shifting mechanism is necessary to reverse the word. Other code converters, such as those which store a word quantity in one code and instantaneously convert the entire word to another code can usually be adapted to supply the least significant digit first. However, these devices are generally complex in that they require means for simultaneously storing the same word in both codes. Also most of the known code converters are not capable of translating in both directions, i.e. cyclic to conventional and conventional to cyclic, with equal ease. Although many known converters which translate from conventional to cyclic codes may be made to translate in the opposite direction by continually reinserting the translated word and performing the same operation a given number of times, an excessive amount of time is required in going through all of the intermediate codes, and the number of intermediate codes varies irregularly with the length of the word to be translated.

It is an object of this invention therefore to provide a binary digital code converter which will translate between reflected and conventional binary codes.

It is another object to provide a digital code converter which may be interrogated or read out in series with the least significant digit first, and which utilizes a minimum number of components.

Another object is to provide such a device which will store a word indefinitely in either the reflected, the conventional or any related binary code and which can be made to translate at will.

A further object is to provide such a device where translation may be performed with equal ease and speed in either direction.

A still further object is to provide such a device which will also shift digital information in either code in serial fashion with the least significant digit first.

These and other objects are achieved through a unique application of two principles relating the conventional and the reflected or cyclic binary codes. The application of these principles comprises the provision of a series of bistable elements which are set to states representing the values of integers of various significance in a coded word to be translated. The states of the elements are sequentially interrogated in order of significance. Whenever a state representing a "one" integer is sensed by the interrogation, the state of the element in the next less significant integer position is changed. If the state of an element represents a "zero" integer, no change is performed on the next less significant element. Each interrogation and change if any, is fully completed before the next interrogation takes place. Where the translation is from the cyclic to the conventional code the interrogation proceeds in order from the most to the least significant bistable element. Where translation is from conventional to cyclic, the interrogation proceeds in the opposite direction. In either case, however, a "one" integer in any element is always used to change the state of the next less significant element.

The interrogation and switching may be accomplished by arranging the bistable elements in order of significance and providing finite signal outputs when a "one" integer is represented. These signals are applied to individual signal coincidence elements whose outputs are applied to trigger or switch the state of the next less significant element. A tapped delay line is provided with outputs going to each of the respective signal coincidence circuits. By supplying an initial pulse to one end of the delay line, the condition of each bistable element is interrogated in succession, and when a "one" state is seen, sufficient time is allowed to change the state of the next succeeding element before its output is interrogated.

In a more specific embodiment a conventional binary shift register is made to perform a code converting operation simply by adding a delay line and coincidence elements to the bistable elements of the register as described, and by disabling the normal register carry-over between the elements.

Although the conventional and cyclic binary codes originally were developed for entirely different purposes (i.e. the conventional code to provide versatility and simplicity, and the reflected or cyclic code to avoid ambiguity), there is a definite relationship between them which can be expressed in a number of different ways. For example, any word in either code may be considered as the sum represented by a series of multipliers or integers whose relative positions represent multiplicands which differ logarithmically in value and significance. In this respect, they both resemble the conventional Arabic or decimal number system. The multipliers or integers in the binary codes, however, have only two possible values (0 or 1), and both have multiplicands with a logarithmic base of 2. The conventional binary coded word is characterized by multipliers which are all positive and by multiplicands which follow a $2^n$ pattern, wherein $n$ is the position of any multiplicand from that having the least significance. The cyclic or reflected binary coded word has multipliers which are alternately positive and negative for each like group, and has multiplicands which follow a $2^{n+1}-1$ pattern.

The following is a number chart by which the multipliers (underlined) for every possible combination of the cyclic and conventional binary codes are shown in order of significance:

*Order of Significance*

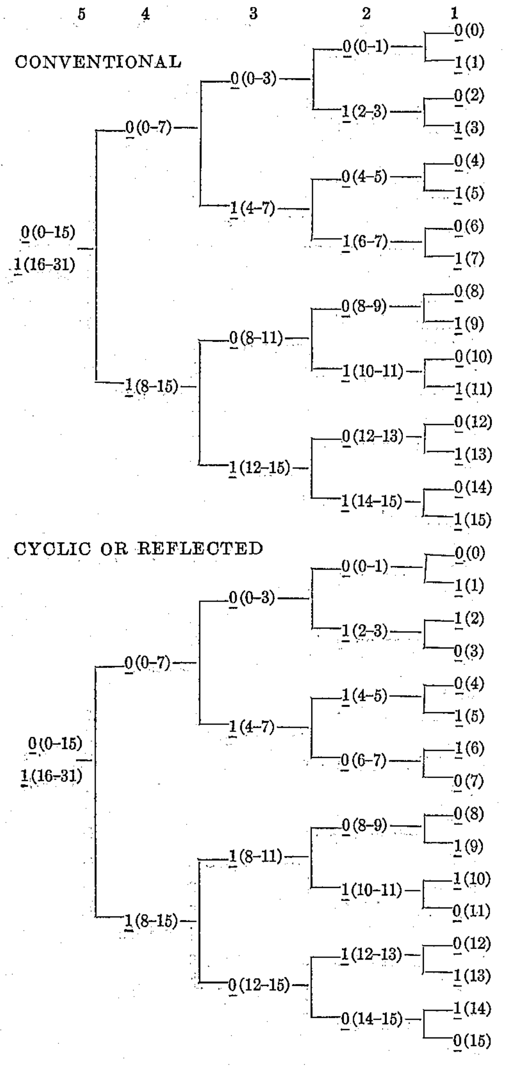

In the parentheses following each multiplier the possible decimal sums are indicated for all combinations from that point, of integers of lesser significance. Thus, for the first "one" multiplier in the third significant position of the conventional binary code, the possible decimal sums which may be obtained are from 4 to 7. It is to be noted that corresponding sets of parentheses in each system indicate the same possibilities for the various decimal sums. Thus, the lowermost parentheses of the third significant column in both codes indicates decimal sum possibilities which range from 12 to 15.

The relationships and distinctions between the two code systems can be seen most easily in the above arrangements. The first distinction to be noted is the manner in which the multipliers change in any given position of significance. In the conventional binary system the multipliers in any significant position change continuously to produce a 0, 1, 0, 1 sequence, whereas in the cyclic code they change intermittently to produce a 0, 1, 1, 0 sequence. In counting downward in corresponding positions of significance in both codes, it can be seen therefore that alternate pairs of multipliers represent the same possible decimal sums in either code whereas the in-between multipliers represent mutually opposite decimal sum possibilities in either code. Thus, in the second significant position of the conventional binary code the first pair of multipliers 0, 1, represent the same decimal sum possibilities as do the first 0, 1, multipliers in the second significant position of the cyclic code. Also the third pair of multipliers of this position in the conventional binary code represent the same respective decimal sum possibility as their corresponding third pair of multipliers in the same position of the cyclic code. On the other hand, the second and fourth pairs of 0, 1, multipliers in the second significant position of the conventional code represent decimal possibilities which are mutually reversed with respect to those of the second and fourth 0, 1, multipliers of the second significant position of the cyclic code. Since the conventional binary multipliers change sucessively according to a 0, 1, 0, 1, pattern in every significant position and since each multiplier in any position is followed by a pair of multipliers in the next less significant position, the alternate pairs of multipliers which are reversed can be distinguished from those which are not reversed by referring to the next more significant conventional binary multiplier. If that multiplier is a 1 then the conventional and cyclic multipliers will be reversed with respect to each other for corresponding decimal sum possibilities, whereas if the next more significant conventional multiplier is a 0 the corresponding conventional and cyclic multipliers will be identical.

A second important relationship between the two codes may be noted from mere observation of the given arrangements. In the arrangements it can be seen that any "one" multiplier in either code which is preceded by "zero" multipliers in all its more significant positions, has a corresponding "one" multiplier in the other code which is also preceded by "zero" multipliers in all its more significant positions. Further, in each case, both of the "one" multipliers represent the same decimal sum possibilities. Thus, the first "one" multiplier in the second significant position of the conventional binary arrangement produces a (2–3) decimal possibility which is exactly the same as that produced by the first "one" multiplier in the second significant position of the cyclic arrangement. Both these "one" multipliers are preceded by zeros in all their more significant positions. Also, the first "one" multiplier in the third significant position of both codes produces a (4–7) decimal sum possibility. Since for all practical purposes a "one" multiplier which is preceded by zeros in the more significant positions is effectively the most significant digit of a given number, it may be stated that the most significant digit of any number is identical in both the cyclic and conventional binary codes.

From the above, two propositions may be formulated from which the code converting technique of the present invention is derived. The first is that the value of any multiplier in a conventional binary coded word is indicative of whether its next less significant multiplier will be the same or different than a corresponding multiplier for the same word in the cyclic code. The second proposition is that the most significant integer in any binary coded word is identical in both value and significance whether the word is expressed in either code. Thus a binary word which is represented in the cyclic code may be translated into its corresponding representative conventional code by first considering its most significant integer as the most significant integer of the same word as in conventional code (second proposition), and beginning with this integer, by consecutively using the value of the least significant conventional integer to change or not to change the value of the next less significant word integer, whereupon it also becomes a conventional binary integer (first proposition). For example, the decimal sum 5 is expressed in cyclic binary notation as 1, 1, 1. To convert to conventional notation according to the above two propositions, the most significant integer (1) is considered as the most significant conventional binary integer. At this point it is also the least significant conventional integer present in the word. Since it is a 1 the next less significant word integer is changed from 1 to 0. This 0 thereby becomes the least significant conventional integer in the word and on the basis of its being a 0 the next less significant word integer (1) is not changed. The word pattern then becomes 101 which is the conventional binary representation of the decimal sum 5.

The means for mechanizing the foregoing technique may be seen in the following description of the accompanying figures of which, FIG. 1 is a schematic block diagram illustrating a first embodiment of the invention.

Figure 1:
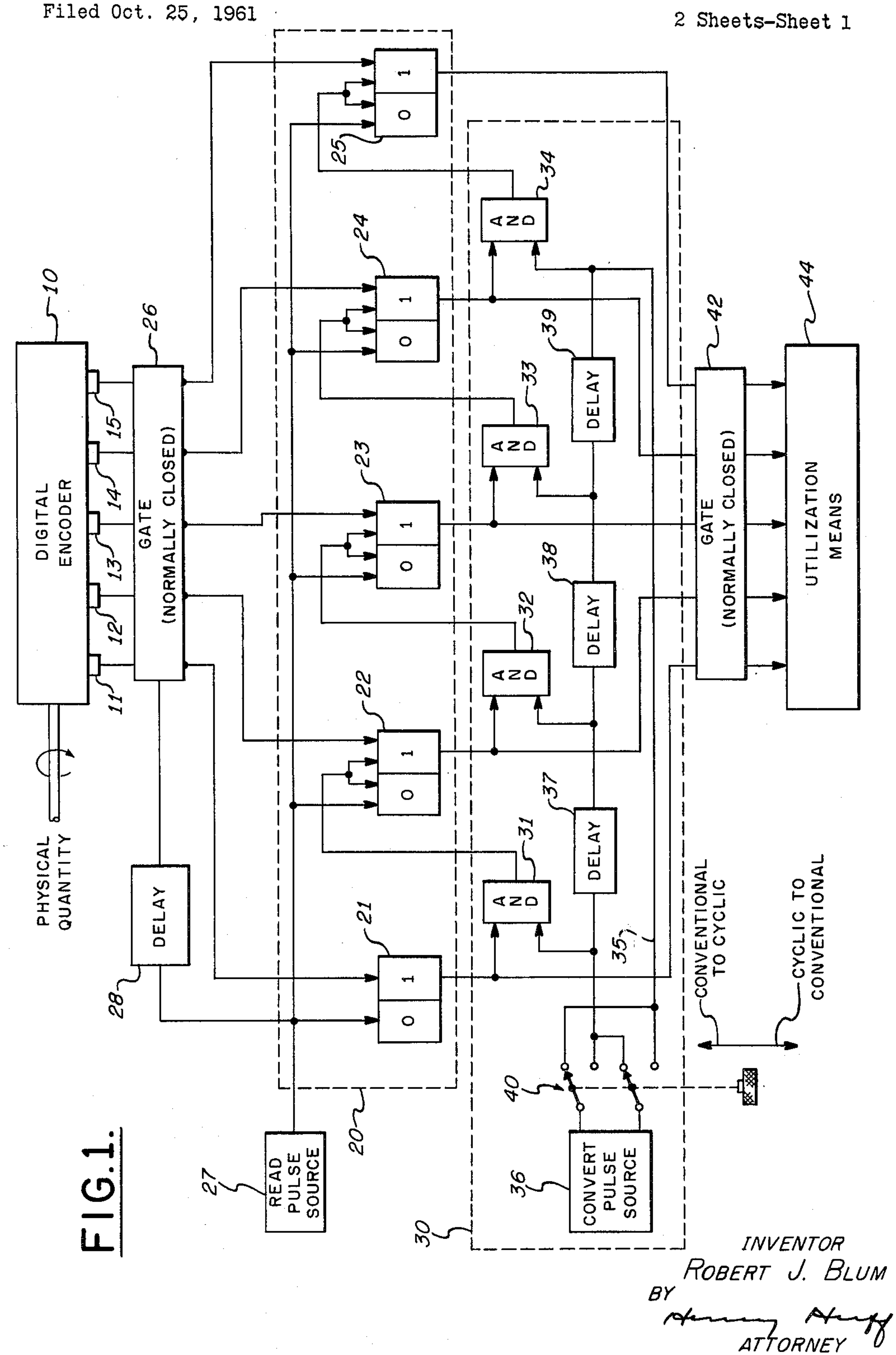

Referring now to FIG. 1, a first embodiment of the invention is seen to comprise a digital encoder 10, a storage register 20, a code converter system 30 and a utilization means 44. Physical quantities, such as shaft rotations are given digital representations in the encoder according to a selected binary code. The digitalized quantities are transferred to the storage register 20 where they remain until acted upon by the code converter system 30. The outputs of the storage register are then supplied to the utilization means 44.

The digital encoder 10 may be any of several well-known quantizing devices which will convert analogue type information such as shaft rotation to a useful digital form. The present encoder is adapted to provide parallel read out and thus has five output terminals 11–15 upon which either finite or zero voltage signals may occur. The combinations of zero and finite voltages which are present on the output terminals of the encoder represent binary words which in turn have corresponding decimal sums. The manner in which these combinations of zero and finite voltages change with changes in decimal sums depends upon the type of binary code system employed. Generally speaking it may be said that in most binary systems as in the conventional decimal system, a word sum is comprised of a series of integers whose significance increases in orderly logarithmic fashion from right to left. Thus the output terminals of the encoder are arranged in this order of significance.

The cyclic or reflected binary code is used in the present encoder because of its relative freedom from ambiguity and its high resolution capability. Freedom from ambiguity occurs because as the count in this code increases, no more than one integer changes at any given time. In the conventional binary code, most often more than one integer changes at a time and in some cases every integer of an entire word may change simultaneously. It often happens that when a reading is obtained during the time the count is changing, a good possibility exists that some of the integers of one number and some of the integers of the next higher or lower number may be read into one word. It can be seen that the effect in the conventional binary system would result in a drastic error whereas in the cyclic system the error is minimized.

The higher resolution capabilities of the cyclic code may be seen from the number arrangements given above. The least significant multiplier in the conventional system changes for each count, while in the cyclic system it changes for every two counts. Thus, when the multipliers are represented as discrete physical entities as in a code wheel, the dimensional limitations for corresponding counts in the cyclic code are far less restricted than for the conventional code.

The storage register 20 comprises an array of bistable elements 21–25. Each element has two stages designated respectively as 0 and 1. By application of a short duration signal at a proper input terminal either stage may be set to an "on" condition, where it remains until the other stage is switched "on." Also, by simultaneously applying a signal to the inputs of both stages of a bistable element the previously "on" stage may be turned "off" while the other stage will be turned "on," irrespective of which stage was originally "on". The particular stage in the "on" condition designates the state of a bistable element at any time, which may be a "zero" or a "one". Although any of a great number of well-known devices such as hydraulic, pneumatic or mechanical single-pole-double-throw switches will perform in the manner indicated, the conventional electronic flip-flop circuit found in most digital computer applications is preferred and the description of the present embodiment will continue in reference to such elements.

Each bistable element of the storage register represents a binary word integer of distinct significance and the particular stage which is "on" represents the value of the integer. The elements are arranged in an order of significance which decreases from left to right. The input of the 1 stage of each element is connected via a normally closed gate circuit 26 to an output terminal of corresponding significance on the encoder 10. Each 0 stage is connected to a common read pulse source 27. The purpose of this device is to assure that the 0 stage of each bistable element is in its "on" condition prior to the interrogation of the output of the digital encoder. The pulse source 27 is also connected via a delay element 28 to open the gate circuit 26 after the bistable elements have all been "erased" or set to the 0 state.

The 1 stage of each bistable element has an output terminal upon which a finite voltage is produced whenever that stage is "on," and which produces zero voltage when the stage is "off". These output terminals are connected via a normally closed output gate 42 to corresponding input terminals of the utilization means 44. The utilization means is generally a digital computer but may be any device which processes or gives an indication of applied binary data. Information from the storage register 20 may be transferred to the utilization means at any time simply by supplying a voltage to open the output gate circuit 42.

The code conversion system 30 comprises a series of coincidence circuits 31–34, a delay line 35, and a convert pulse source 36. The coincidence circuits, more commonly known as "and gates," have the characteristic of producing an output signal only upon the simultaneous application of finite voltages to two input terminals. One of the input terminals of each "and gate" is connected to the 1 stage output of a corresponding bistable element in the storage register. The output of the "and gate" is connected to the inputs of both stages of the next succeeding bistable element in decreasing order of significance. Thus an output signal from an "and gate" will change the state of the next succeeding bistable element irrespective of its previous state. The remaining input terminal of each "and gate" is connected to a discrete point along the delay line 35. The delay line comprises a signal transmission line with a plurality of delay elements 37, 38, 39, arranged in such a manner that a signal applied to one end of the line will be incident upon each "and gate" in succession. The pulse source 36 supplies a convert pulse signal to the delay line 35. A double-pole double-throw reversing switch 40 is provided between the pulse source 36 and the delay line 35 to control the direction of propagation of the convert pulse through the line. As will be explained, when the convert pulse passes through the delay line in one direction conversion from conventional to cyclic code is effected, and when the pulse passes in the opposite direction, conversion from the cyclic to conventional is produced.

In operation of the device, a physical quantity is continuously monitored by the digital encoder 10. A reading is obtained by application of a short duration pulse from the read pulse source 27. This immediately erases any prior information in the storage register by setting each bistable element to its "zero" state. When this is accomplished, the portion of the read pulse applied to the delay element 28 then opens the gate circuit 26 for a short duration, thus connecting the encoder output terminals to the storage register 20. Those terminals which are at a finite voltage will cause their corresponding bistable elements to be switched to the "one" state while the remaining elements are left in the "zero" state. In this manner, the array of bistable elements is made to represent in cyclic binary notation the magnitude of the physical quantity supplied to the encoder.

Conversion from cyclic to conventional code is accomplished by setting the convert switch 40 to its lower position and supplying a convert pulse from the source 36 to the delay line 35. The pulse propagates through the delay line from left to right, becoming incident upon an input terminal of each "and gate" in succession. If an "and gate" at the time of application of the convert pulse is also being supplied with a finite voltage from its corresponding bistable element, it will produce an output voltage to change the state of the next succeeding bistable element, whereas if no voltage is being supplied from its bistable element, no change is produced on the next succeeding element. It is to be noted that the delay line is adjusted to give sufficient time to completely change the state of a bistable element before the delay line pulse becomes incident upon its "and gate."

Figure 2:
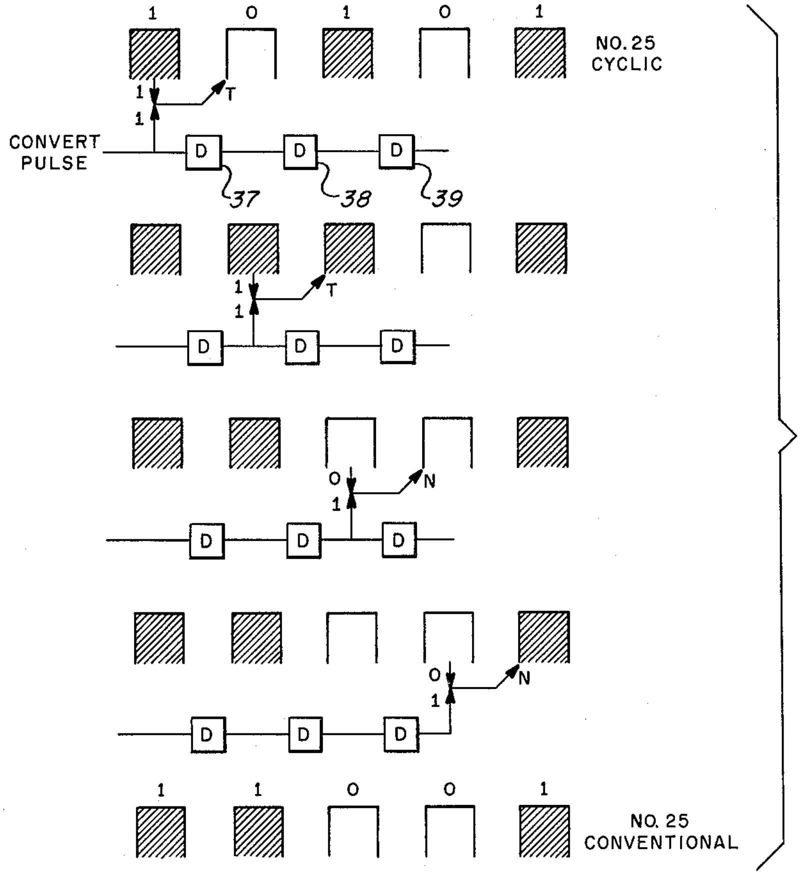
FIG. 2 is a series of diagrams useful in analyzing the operation of the embodiment of FIG. 1.

The manner in which code conversion takes place may be understood more readily by reference to FIG. 2. In this figure the various pulse positions are shown for the five bistable elements of the binary storage register 12 at different stages in the translation process. The cross-hatched positions represent bistable elements in the "one" state while clear positions represent bistable elements in their "zero" state. For purposes of explanation it will be assumed that the register is set to represent the number 25 in cyclic binary code. Thus the first, third and fifth bistable elements are initially in their "one" state while the second and fourth are in their "zero" state, to give a 1, 0, 1, 0, 1 pattern. The delay line 35 is shown with its three delay elements 37–39.

In the initial stage of the translation process the convert pulse is compared with the signal output at the most significant position. Since both have a finite value a trigger (T), is produced to change the state of the second most significant position from zero to one. In the second stage of the process, the second most significant pulse position is seen to be now in a "one" state. At this point the convert pulse has passed through the first delay element to be compared with the signal output at this position. Again a coincidence of finite signals occurs and a second trigger (T), is produced to change the state of the third most significant pulse position from a "one" to a "zero" state. In the third stage of the process, the third pulse position is seen to have been changed to a "zero" state while the convert pulse is shown as having passed through the second delay element to be compared with it. At this point, however, no trigger (N) is produced since the zero valued signal output of the third pulse position does not coincide with the finite value of the convert pulse. Thus, as is shown in the fourth stage of the process, no change has been produced on the state of the fourth pulse position, which remains at zero. Here again, when the convert pulse emerges from the third delay element to be compared with the state of the fourth pulse position, no coincidence is seen and no trigger (N) is produced. Thus, the fifth pulse position remains in its original 1 state. As can be seen in the fifth and last stage, the pulse arrangement is 1, 1, 0, 0, 1; which is the conventional binary notation for the number 25.

The ease with which a conversion may be accomplished in the opposite direction, i.e. from conventional to cyclic, may also be seen in the arrangements of FIG. 2. To convert in the opposite direction the convert pulse is merely applied from the right end of the delay line. By following each sequence in order, beginning with the lowermost the entire reverse conversion process may be seen. While the embodiment of FIG. 1 has been described in conjunction with parallel input and output means, the invention is equally applicable to serial type digital systems and finds particular utility in the ease with which it may be adapted to such systems. In the interest of simplicity and compactness encoding devices and computer systems often are designed so that digital information is transferred between them in serial fashion, integer by integer, over a single line. In order to effect this transfer a device such as a shift register is generally provided. This device comprises a series of bistable elements with transfer means between them to set the state of each element according to the previous state of the next adjacent element whenever a shift signal is supplied.

Figure 3:
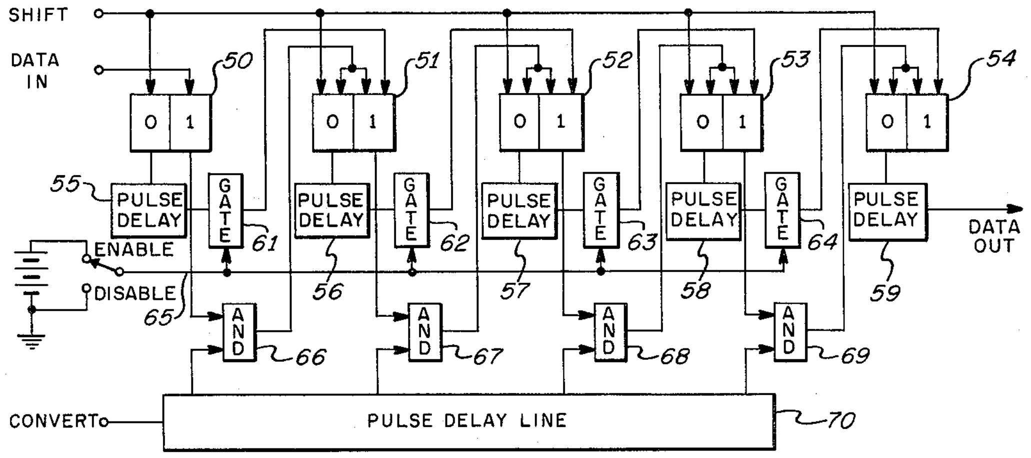
FIG. 3 is a schematic diagram illustrating an application of a preferred embodiment of the invention.

The embodiment of FIG. 3 shows an application of the present invention wherein a conventional shift register mechanism has been adapted, with a minimum of changes, to perform a code conversion operation. The register comprises a series of bistable elements 50–54 each having two stages 0 and 1, as in the storage register of the preceding embodiment. The output of each 0 stage is connected to a corresponding pulse sensitive delay circuit 55–59 which is responsive to its respective 0 stage going from an "off" to an "on" condition to produce an output voltage for a preselected length of time. The output of each pulse sensitive delay circuit is connected to the input of the 1 stage of the next adjacent bistable element. Consequently whenever any bistable element goes from a 1 to a zero state, i.e. when its 0 stage goes from an "off" to an "on" condition, the next adjacent bistable element will be set to a 1 state. However, when a bistable element goes from a 0 to 1 state or remains in a 0 state no signal will be passed through its pulse sensitive delay circuit, and the next adjacent element is left unchanged. A common shift line is provided with connections to the input of the 0 stage of each bistable element.

In the shift mode of operation a short duration signal is applied to the shift line causing each bistable element to revert to its zero state. The zero stage of those elements which were previously in the "one" state will go from an "off" to an "on" condition and will result in a signal being produced at the output of their respective delay circuits for a finite time thereafter. When the shift pulse is removed, the signal still appearing at the output of these delay elements will cause the next succeeding bistable element to be switched to its "one" state. The "zero" stages of those elements which had previously been in the "zero" state will not undergo any change upon application of the shift pulse, thus no signal will appear at the output of the corresponding delay elements and upon removal of the shift pulse the next succeeding element will remain in the "zero" condition. The overall effect of this is to cause each element which was preceded by an element in a "one" state to be switched to its "one" state and every element which was preceded by an element in the "zero" state to be switched to its "zero" state.

After each shift operation the first bistable element is in its "zero" state. Information may be applied to this element via a data line upon which either a zero or a finite signal appears between the occurrence of each shift pulse. In this manner a binary word is applied digit by digit to the first bistable element and shifted to the right until the entire word appears in the register.

In order to enable the device to perform a code converting operation according to the present invention, an inhibit or gate circuit 61–64 is provided between the output of each pulse delay element and the input to the "1" stage of the next succeeding bistable element. Each gate circuit is connected to a common disable line 65 upon which a finite signal from a source is impressed during the code converting operation. The finite signal causes the gate circuits to prevent the passage of any output signals from the pulse delay elements, thus effectively isolating the bistable elements.

The output of each 1 stage of the bistable elements is connected to a corresponding coincidence circuit 66–69 such as an "and gate" as in the preceding embodiment. The output of each "and gate" is applied to an input terminal of both stages of the next succeeding bistable element also as in the preceding embodiment. Finally the remaining inputs of each "and gate" are connected to discrete points along a pulse delay line 70.

In operation of this embodiment, a binary word in the cyclic code is inserted into the register in the manner described. A finite signal is then applied to the disable line to mutually isolate each of the bistable elements. A convert pulse is then applied to the delay line from which it is successively applied to an input of each "and gate." The "and gates" upon which a finite signal appears from their respective bistable elements at the time of application of the convert pulse will produce a trigger signal to change the state of their next succeeding bistable element. After completion of the code conversion the shift disable signal may be removed to restore conventional shift register operation.

It can be seen with this system that a binary word may be shifted into the system least significant digit first, a code conversion performed, and the word shifted out again the least significant digit first. Furthermore the only additional elements needed to convert a conventional shift register to perform this operation are inhibited circuits, coincidence circuits and a delay line. It is also to be noted that conversion may be performed from binary to cyclic as described in the preceding embodiment by application of the convert pulse from the opposite end of the delay line.

While the invention has been described in its preferred embodiments it is to be understood that the words which have been used are words of description rather than limitation and that changes within the purview of the appended claims may be made without departing from the true scope and spirit of the invention in its broader aspects.

What is claimed is:

1. A code converter comprising a plurality of bistable elements, each element being capable of being set to either of two alternate stable states and further being capable of being switched from either alternate state by application of a trigger input signal, a plurality of trigger signal generating means, each being responsive to only one given state of a corresponding bistable element to supply a trigger signal to another bistable element, independently controlled means for sequentially activating each of said trigger signal generating means, and switching means for reversing the sequence of activating the various trigger signal generating means.

2. A code converter comprising a plurality of bistable elements which remain in either of two alternate states until application of a switching signal at a proper input terminal, each of said bistable elements being adapted to produce a finite output signal when in one particular state only, a plurality of signal coincidence elements, each of said signal coincidence elements being responsive to the concurrence of an output signal from an associated bistable element and an independently applied short duration conversion signal to change the state of another bistable element and means for sequentially supplying a conversion signal to each of said signal coincidence elements.

3. A device for translating cyclic and conventional binary coded words, said device comprising a plurality of bistable elements which remain in either of two alternate states until switched by application of a proper input signal, said bistable elements producing zero and finite output signals corresponding to said alternate states, said bistable elements being representative of binary word integer positions of various significance, means for setting the state of each bistable element according to the value of a corresponding digit of a binary coded word such that a finite signal output is produced by each element set to correspond to a one integer of said word, a plurality of signal coincidence elements responsive to the concurrence of finite values of two input signals to produce an output switching signal, means responsive to output signals from each signal coincidence element to change the state of a corresponding bistable element, means connecting the output of each bistable element to a first input of the signal coincidence element corresponding to the bistable element which represents the next less significant word integer, means for successively and in order of increasing significance of corresponding bistable elements supplying finite signals to the remaining input of each signal coincidence element, and reversing means to supply finite signals to the signal coincidence elements successively in order of decreasing significance.

4. A binary code transfer and translation device comprising a series of bistable elements which produce output signals representative of two alternate stable states of said elements, each of said bistable elements being representative of a bit of unique significance in the binary code to be translated, first and second actuable signal transfer means between each of said bistable elements, said first signal transfer means being responsive, when actuated, to a first given output signal of one bistable element to set its next adjacent bistable element to a preselected state, said second signal transfer means being responsive, when actuated, to a second given output signal of one bistable element to change the state of its next adjacent bistable element, means for simultaneously actuating each of said first signal transfer means in a first time interval, and means for sequentially actuating each of said second signal transfer means in a second time interval.

5. A binary code transfer and translation device comprising a series of bistable elements each representing a bit of unique significance in the code to be translated, each of said bistable elements being capable of being set to first and second alternate stable states by application of finite signals at first and second input terminals on each element respectively, each of said elements further being responsive to a finite signal at a third input terminal to change its state, means for simultaneously applying a short duration finite signal to the first input terminal of each bistable element, first and second actuable connecting means between each bistable element, each of said first connecting means responsive, when actuated, to its respective bistable element going from its second to its first stable state to supply a finite signal to the second input terminal of an adjacent bistable element for a duration greater than said short duration finite signal, each of said second connecting means responsive, when actuated, to its respective bistable element being in its second stable state to supply a finite signal to the third input terminal of an adjacent bistable element, means for simultaneously actuating each of said first actuable connecting means in a first time interval and means for sequentially actuating each of said second actuable connecting means in a second time interval.

6. A binary signal processing device comprising a series of bistable elements which have first and second alternate stable states to which each element can be set by application of finite signals at first and second associated input terminals respectively, each of said elements representing a bit of unique significance in the code to be translated, each of said elements capable of being switched from either stable state upon application of a finite signal to a third input terminal, disconnectable signal coupling means between said bistable elements, each of said disconnectable coupling means being responsive, when connected, to a corresponding one of said bistable elements going from its second to its first stable state to supply a finite signal for a given duration thereafter to the second input terminal of the adjacent one of said bistable elements in the direction of one end of said series, actuable signal coupling means also connected between said bistable elements, said actuable signal coupling means responsive, when actuated, to a corresponding bistable element in its second stable state to supply a finite signal to the third input terminal of the adjacent bistable element in the direction of said one end of said series, means for supplying zero and finite valued binary coded pulse signals to the first bistable element at the opposite end of said series, means for supplying a finite signal of duration less than said given duration to the first input of each bistable element during the times between the occurrence of each of said binary coded pulse signals, means for disconnecting said disconnectable signal coupling means at a given time and means for sequentially actuating each of said actuable signal coupling means in order along said series during said given time.

7. A device for translating between cyclic and conventional binary coded words, said device comprising a plurality of bistable elements which remain in either of two alternate states until switched by application of a proper input signal, said bistable elements producing zero and finite output signals corresponding to said alternate states, said bistable elements being representative of binary word integer positions of various significance, means for setting the state of each bistable element according to the value of a corresponding digit of a binary coded word, switching means associated with each bistable element, each of said switching means being responsive, when activated, to a given state of its associated bistable element to change the state of the bistable element representing the next less significant word integer position, means for sequentially activating each of said switching means in order of significance of associated bistable elements, said switching means being activated in response to a finite applied signal, said means for sequentially activating said switching means comprising a convert pulse signal generator, a pulse transmission line connected at one end to said convert pulse generator, said pulse transmission line including pulse delay elements and means connecting points along said pulse transmission line between said delay elements to corresponding switching means.

8. The device as described in claim 7 wherein each of said delay elements is capable of delaying a pulse signal for a duration greater than the switching time of one of said bistable elements.

9. The device as described in claim 7 further including switching means connecting different ends of said pulse transmission line to said convert pulse signal generator.

10. In combination:

(*a*) a normally-closed input gate to admit binary coded data, (*b*) a flip-flop for each bit in the code to be used, said flip-flops being connected to receive information from the input gate, (*c*) a read pulse source connected to set all of the flip-flops to the "zero" state, (*d*) a delay circuit interconnecting the read pulse source and the input gate, said delay circuit serving to open the input gate a predetermined time after the commencement of a read pulse, (*e*) means to set the flip-flops to the "one" state in response to a signal received through the input gate, (*f*) an output gate, (*g*) individual conductors extending between each flip-flop to the output gate and connected to conduct a finite signal to the gate whenever the flip-flop is in the "one" state, (*h*) a convert pulse source, (*i*) a tapped delay line coupled to receive energy from the convert pulse source, (*j*) individual "and" gates connected between successive flip-flops, said "and" gates being coupled to receive energy from a flip-flop in the "one" state and to couple a switching signal to the flip-flop representing the binary digit of next lower significance, said "and" gates being further coupled to the tapped delay line so that a predetermined time interval exits between pulses applied to successive "and" gates, (*k*) a convert switch arranged to pass pulses from the convert pulse source through the delay line in either direction.

References Cited in the file of this patent

UNITED STATES PATENTS 2,764,564 Samson et al. ____________ Sept. 11, 1956

OTHER REFERENCES

IBM Technical Disclosure, T. J. Hennessey, "Gray Code to True Binary Code Converter," vol. 3, No. 10, March 1961 (p. 49 relied on).